C. ZIRNBAUER.
MOUSE AND RAT TRAP.
APPLICATION FILED DEC. 16, 1914.

1,188,231.

Patented June 20, 1916.

Witnesses
J. C. Simpson
Harry M. Test

Inventor
C. Zirnbauer.

Attorneys

UNITED STATES PATENT OFFICE.

CHARLES ZIRNBAUER, OF SAN FRANCISCO, CALIFORNIA.

MOUSE AND RAT TRAP.

1,188,231.	Specification of Letters Patent.	Patented June 20, 1916.

Application filed December 16, 1914. Serial No. 877,546.

*To all whom it may concern:*

Be it known that I, CHARLES ZIRNBAUER, a subject of the Emperor of Germany, residing at San Francisco, in the county of San Francisco, State of California, have invented certain new and useful Improvements in Mouse and Rat Traps; and I do hereby declare the following to be a full, clear, and exact description of the invention, such as will enable others skilled in the art to which it appertains to make and use the same.

This invention relates to improvements in animal traps, and particularly to traps for catching rats and mice.

The principal object of the invention is to provide a trap which will not only catch rodents but which will destroy them as well.

Another object is to provide a rat trap wherein a novel means is provided for resetting the trap for a subsequent animal when the first animal has been caught.

Other objects and advantages of the invention will be apparent from the following description when taken in connection with the accompanying drawings.

Figure 1:
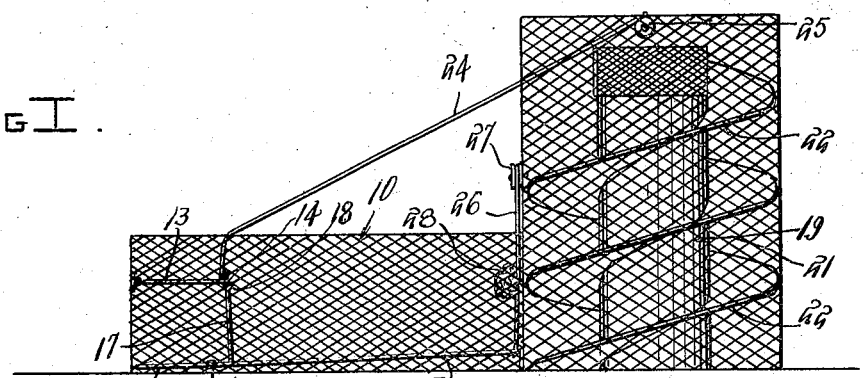
Figure 3:
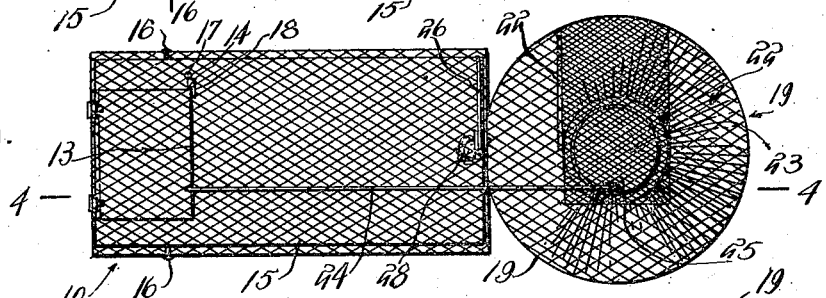
Figure 4:
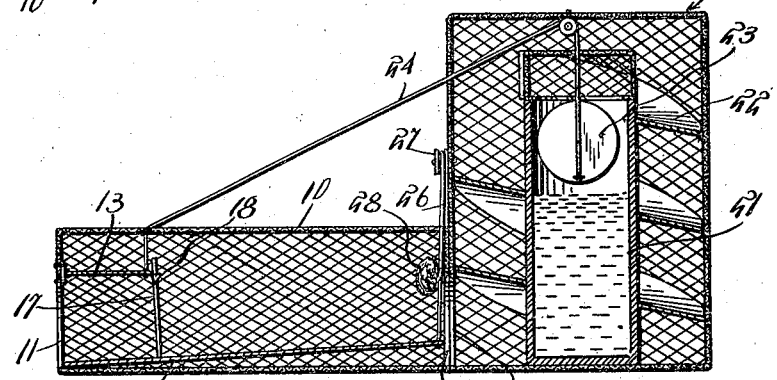
Figure 2:
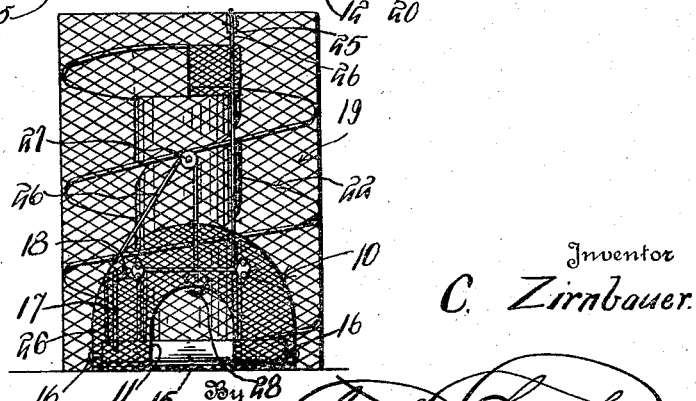

In the drawings: Figure 1 is a side elevation of the trap made in accordance with my invention. Fig. 2 is a front elevation. Fig. 3 is a top plan view. Fig. 4 is a sectional view on the line 4—4 of Fig. 3.

Referring particularly to the accompanying drawings, 10 represents an elongated wire cage having an entrance opening 11 in one end and an exit opening 12 at the other end. Hinged in the front end of the cage for closing the opening 11 is a vertically moving door 13, said door being arranged to be held in elevated position, to uncover the opening, by means of a hook 14 pivotally mounted in the side of the cage. Extending longitudinally from one end of the cage to the other is a platform 15, the same being mounted on a horizontal pivot 16 adjacent the entrance end 11. Carried by one edge of the platform slightly in advance of the pivot 16 is a vertically extending rod 17 which is loosely connected with a laterally extending arm 18 formed on the hook 14.

Assuming the door 13 to be in raised position and held by the hook 14, and the platform 15 with its rear end, or the end adjacent the opening 12, in slightly elevated position, and a rat enters the opening 11 and steps upon the platform at a point beyond the pivot, the same will be depressed and by means of the rod 17 rock the hook 14 out of engagement with the door 13, thus permitting the door to fall and close the opening 11. Secured to the exit end of the cage is a tower-like structure 19, an opening 20 being formed in the lower end and registering with the opening 12. Extending down through the center of the tower is a metal cylinder 21 which is filled or partially filled with water. Between the cylinder and the wall of the tower is arranged a spiral runway 22 which leads to the top of the tower and at a point adjacent the upper end of the cylinder 21. Pivotally mounted over the upper end of the cylinder is a trap door 23, and connected at one end to the free edge of the door and at its other end to the free edge of the door 13 is a cord 24, this cord passing upwardly from the door 23 and over a suitable pulley 25 mounted on the top of the tower. Secured to the inner end of the platform 15 is a cord 26 which passes over a pulley 27 mounted on the tower above the opening 20 and depends at a point just over the exit opening 12. When the rat reaches up to get the bait 28 which is secured to the cord 26, the downward movement of the platform will cause the bait to be pulled up out of reach, the animal's weight holding the platform down. The opening 11 being closed by the door 13, leaves only one opening through which the animal will see a possible means of escape. The animal will thus pass through the opening 12 and up the runway 22 of the tower. When he reaches the top of the tower and steps on the trap door 23 the door will swing downwardly precipitating the animal into the water. This downward movement of the trap door 23 pulls on the cord 24 and raises the door 13 into position to be engaged by the hook 14 whereby the trap is thus set for another animal. The trap door 23 is properly weighted at one side of its pivot so that it will swing into a normal level position when no weight is applied thereto.

What is claimed is:

An animal trap comprising a trap chamber including a door and tilting platform, said platform being actuated by the weight of an animal to release the door, a second chamber connected with the first chamber and including a water chamber having a depressible trap door above the water chamber, a pulley supported by the second named chamber, a bait holder in the first named chamber, a cord trained over the pulley and connecting the tilting platform and bait holder to elevate said holder when the platform is tilted downwardly, and a flexible connection between the first named door and the trap door for moving the trap door into position to be stepped upon by the animal when the first named door is closed.

In testimony whereof, I affix my signature, in the presence of two witnesses.

CHARLES ZIRNBAUER.

Witnesses:
 HARRY BRACHER,
 NELLY GAEDE.

Copies of this patent may be obtained for five cents each, by addressing the "Commissioner of Patents, Washington, D. C."